(12) United States Patent
Casper et al.

(10) Patent No.: US 6,297,311 B1
(45) Date of Patent: Oct. 2, 2001

(54) AQUEOUS COATING COMPOSITION

(75) Inventors: James William Casper, Stokenchurch; David Robert Fenn, Burnham; Richard Paul Redman, Reading, all of (GB)

(73) Assignee: PPG Industries Ohio, Inc., Cleveland, OH (US)

( * ) Notice: Subject to any disclaimer, the term of this patent is extended or adjusted under 35 U.S.C. 154(b) by 0 days.

(21) Appl. No.: 09/055,464

(22) Filed: Apr. 6, 1998

(30) Foreign Application Priority Data

Apr. 9, 1997 (GB) .................................................. 9707166

(51) Int. Cl.$^7$ ....................................................... C08J 83/00
(52) U.S. Cl. ............................ 524/507; 524/508; 524/556
(58) Field of Search ..................................... 524/556, 507, 524/508

(56) References Cited

U.S. PATENT DOCUMENTS

| | | | |
|---|---|---|---|
| 4,035,273 | 7/1977 | McGuiness | 204/181 |
| 5,516,834 * | 5/1996 | Mori et al. | 524/504 |
| 5,663,224 * | 9/1997 | Emmons et al. | 524/188 |
| 5,739,378 * | 4/1998 | Jenkins et al. | 560/181 |

FOREIGN PATENT DOCUMENTS

| | | |
|---|---|---|
| 124782 | 11/1984 | (EP) . |
| 1287278 | 1/1962 | (FR) . |
| 1096912 | 8/1963 | (GB) . |
| 2276389 | 9/1994 | (GB) . |
| 890103672 | 11/1990 | (JP) . |

OTHER PUBLICATIONS

EP 0009772 EPO Date Sep. 16, 1980.

* cited by examiner

Primary Examiner—Peter D. Mulcahy
(74) Attorney, Agent, or Firm—Dennis G. Millman; William J. Uhl

(57) ABSTRACT

An aqueous coating composition comprising a dispersion in an aqueous medium of an acrylic addition polymer having carboxyl groups in which a proportion of the carboxyl groups are derived from a carboxyl functional chain transfer agent, the composition also comprising a base in an amount sufficient to at least partially neutralise the carboxyl groups on the polymer.

11 Claims, No Drawings

AQUEOUS COATING COMPOSITION

This invention relates to an aqueous coating composition containing an acrylic addition polymer which has carboxyl groups in which the carboxyl groups are derived substantially from a carboxyl functional chain terminating agent. It also relates to a processes for producing the coating composition to a process of coating using, the composition and to a coated substrate obtainable by the coating process.

One major known class of coating compositions comprises acrylic addition polymer as a film former. These can be carried in an organic solvent or an aqueous medium. The polymer can have various functional groups such as hydroxyl groups. The compositions are applied as a layer to the surface of a substrate and either left to dry and cure at room temperature or else heated to initiate or speed the drying and curing process. These compositions can also contain a crosslinker which reacts with functional groups on the polymer so as to crosslink the final coating film. The crosslinker can be for example a polyisocyanate or a melamine formaldehyde resin. During drying and curing the solvent or water evaporates and the polymer and cross-linker react together so as to produce a crosslinked coating film.

Due to environmental considerations there is a general trend in the coatings industry towards coating compositions with reduced organic solvent content. Coatings with a lower organic solvent content emit lower levels of solvent when they are used and so are less polluting of the atmosphere.

One way to achieve a lower solvent content is to use waterborne compositions. One method of incorporating acrylic addition polymers into water is to make them carboxyl (—COOH) functional by the incorporation of some carboxyl functional ethylenically unsaturated monomer such as acrylic acid during their manufacture, and neutralising at least some of the carboxyl groups in the aqueous composition by adding a base such as alkali metal hydroxide, ammonia or an amine. The resulting neutralised carboxyl groups stabilise the polymer in dispersion in water.

A problem which we have discovered with the use of carboxyl functional monomers is that a relatively high amount needs to be used if the polymers are to remain in stable solution or dispersion in water. This high level of carboxyl leads to poor water resistance when these polymers are made into coating compositions. Alternatively, when a lower level of carboxyl monomer is incorporated, the polymers exhibit poor storage stability.

Coatings used for the painting of motor vehicles are required to have very good physical properties such as hardness and resistance to water and solvents. The coating compositions are also required to have good application and appearance properties so that they are easy to apply to a substrate using spray application and result in final films having good gloss. It is very important that these compositions also have good storage stability so that these properties do not deteriorate in the period between manufacture and use, which is often many months and can be several years. Poor water resistance and/or poor storage stability has been a major problem preventing more widespread commercial acceptance of waterborne coatings comprising carboxyl functional acrylic addition polymers, particularly in the motor vehicle refinish field.

One further component of these types of addition polymers is a chain transfer agent. Chain transfer agents are compounds such as thiols which are added to the polymerisation mixture to control molecular weight during the process of making the polymer. They act by transferring a hydrogen radical to the end of the growing polymer chains which prevents further polymerisation and so limits molecular weight. The residue of the chain transfer agent then initiates a new polymer chain and becomes reacted onto the end of the new polymer chain and thus part of the polymer. Chain transfer agents are particularly important where polymers are required having a low molecular weight and hence a low solution viscosity.

We have found that we can produce water dispersible addition polymers which have carboxyl functionality, a proportion of which is derived from the use of a carboxyl functional chain transfer agent, and that these polymers will form stable dispersions in water at a surprisingly low level of carboxyl groups. Another way of looking at this is that polymers with comparable carboxyl group content are more stable if a proportion of the carboxyl groups are derived from a carboxyl functional chain transfer agent. Without being limited by this theory, it seems that the partially neutralised carboxyl groups stabilise the polymer more efficiently when they are placed on the ends of the polymer by being part of the chain transfer agent than when placed randomly along the polymer by being part of a carboxyl functional monomer. The use of a low level of carboxyl groups allows the formulation of stable aqueous coating compositions which have improved water resistance compared to those compositions of comparable storage stability produced from polymers having carboxyl functionality substantially derived from carboxyl functional monomer. The use of a carboxyl functional chain transfer agent also surprisingly gives rise to better properties than the use of a carboxyl functional initiator which might have been expected to be similar in effect.

According to the present invention there is provided an aqueous coating composition comprising a dispersion in an aqueous medium of an acrylic addition polymer having carboxyl groups in which a proportion of the carboxyl groups are derived from a carboxyl functional chain transfer agent, the composition also comprising a base in an amount sufficient to at least partially neutralise the carboxyl groups on the polymer. Preferably, the polymer also has hydroxyl groups.

The acrylic addition polymer is derived from polymerisable ethylenically unsaturated monomers such as vinyl or acrylic monomers. The polymer comprises structural units, carboxyl functional units derived from a carboxyl functional chain transfer agent and optionally comprises other carboxyl functional units, hydroxyl functional units and other functional units.

When used herein, the term acrylic monomer refers to acrylic or methacrylic acid or their esters. The term (meth) acrylate refers to both the acrylate and methacrylate equally and the term (meth)acrylic acid refers to acrylic or methacrylic acid equally.

The structural units are derived from monomers which are non-functional, that is they do not have reactive functional groups. Examples of non-functional monomers are alkyl esters of (meth)acrylic acid and non-functional vinyl monomers.

Examples of suitable alkyl esters of (meth)acrylic acid are $C_{1-12}$ alkyl esters such as methyl (meth)acrylate, ethyl (meth)acrylate, n-butyl (meth)acrylate, t-butyl (meth) acrylate, and n-propyl (meth)acrylate. Examples of non-functional vinyl monomers are styrene and alpha-methyl styrene.

Examples of other carboxyl functional units are those derived from unsaturated carboxyl functional monomers such as acrylic or methacrylic acid.

The optional hydroxyl functional units are derived from hydroxyl functional vinyl or acrylic monomers. An example of a hydroxyl functional vinyl monomer is vinyl alcohol. Examples of hydroxyl functional acrylic monomers are hydroxyethyl (meth)acrylate, and hydroxypropyl (meth) acrylate and hydroxybutyl (meth)acrylate.

Other examples of suitable hydroxyl functional acrylic monomers are the reaction products of glycidyl (meth) acrylate with mono-carboxylic acids, such as versatic acid and the reaction product of (meth)acrylic acid with monoepoxy compounds such as Cardura E (the glycidyl ester of versatic acid; trade mark of Shell).

Preferably, the polymer comprises 10 to 50% by weight of hydroxyl functional units, more preferably 10 to 40% by weight. Preferably the polymer has a hydroxyl value of 5 to 500 mgKOH/g of polymer, more preferably 50 to 250.

Other functional units are derived from monomers which carry reactive groups other than hydroxyl groups or carboxyl groups, such as, amine groups, acetoacetate groups and epoxy groups. An example of a monomer carrying an amine group is tertiary butyl aminoethyl (meth) acrylate. An example of a monomer carrying an epoxy group is glycidyl (meth)acrylate.

It is also possible to react certain of these other functional groups with other compounds so as to modify the polymer. For example, epoxy groups on the polymer can be reacted with a carboxyl functional compound for example a tertiary carboxylic acid such as versatic acid.

Preferably the proportion of carboxyl groups on the polymer derived from carboxyl functional chain transfer agent, is more than 35%, more preferably more than 40% and most preferably more than 50%.

Preferred acrylic addition polymers comprise between 0.5 and 10 % by weight of units derived from carboxyl functional chain transfer agent based on the total weight of the polymer. More preferably the polymers comprise 1 to 5 % by weight and most preferably 2 to 4 % by weight of units derived from carboxyl functional chain transfer agents.

Examples of carboxyl functional chain transfer agents include mercapto functional compounds. Examples of suitable mercapto functional compounds are mercapto $C_{2-6}$ alkanoic acids such as mercaptopropionic acid. Non-functional chain transfer agents may also be used in mixture with the carboxyl functional chain transfer agent if the molecular weight required is lower than that achievable by the use of the carboxyl functional chain transfer agent alone at a desired acid value.

Preferably the polymer has an acid value of less than 50 mgKOH/g of polymer and more preferably less than 30. We have found that polymers in which a proportion of the carboxyl functionality is derived from the chain transfer agent need to contain less acid in order to form stable dispersions and that, surprisingly, polymers with an acid value of less than 25 can still form stable dispersions or solutions in water. A preferred minimum acid value is 5.

Preferred acrylic addition polymers have a number average molecular weight as measured by gel permeation chromatography of 700 to 10 000, more preferably 1 000 to 6000, most preferably 1500 to 5000.

Preferred acrylic addition polymers have a theoretical glass transition temperature (Fox Tg) of −30 to 100° C., more preferably 0 to 8020 C.

The compositions also comprise a base which at least partially neutralises the carboxyl groups on the addition polymer. Ammonia or an amine or mixtures thereof are the preferred bases, while alkali metal hydroxide bases are useful but less preferred. Examples of suitable amines are dimethylethanol amine, 2-amino-2-methyl-1-propanol and triethylamine. Preferably, the amount of base present is such as to be capable of neutralising between 30% and 100% of the carboxyl groups on the addition polymer. On a weight basis the composition typically comprises between 1% and 10%, and preferably between 2 and 5% of base, based on the weight of the addition polymer.

The aqueous medium comprises predominantly water, optionally also containing organic solvent. Preferably the aqueous medium comprises at least 50% by weight of water and most preferably at least 70%. Suitable water miscible organic solvents include alcohols such as butanol, ether-alcohols such as propylene glycol monomethyl ether and ester alcohols such as propylene glycol methyl ether acetate.

When the addition polymer has hydroxyl groups, compositions optionally comprise a crosslinker for the addition polymer. The crosslinker is a compound which will react with at least two hydroxyl groups. Examples of suitable crosslinkers are melamine formaldehyde resins and polyisocyanates.

Melamine formaldehyde resins are well known in the coating art. They are the product of the reaction of melamine and formaldehyde. Examples of commercially available melamine formaldehydes are partially and fully alkylated melamines such as partially methylated melamines and hexamethoxy methyl melamine.

Polyisocyanates are also well known in the coatings art. Polyisocyanates are compounds having two or more isocyanate groups per molecule. Suitable Polyisocyanates are aliphatic or aromatic polyisocyanates. Examples of suitable aliphatic diisocyanates are hexamethylene diisocyanate and isophorone diisocyanate. Examples of suitable aromatic diisocyanates are toluene diisocyanate and 4,4'-diphenylmethane diisocyanate.

Other suitable polyisocyanates include the isocyanurate trimers, allophanates and uretdiones of diisocyanates such as those described above as well as the reaction products of these diisocyanates with polyols. Polyols are compounds having three or more hydroxyl groups. Suitable polyols include trimethylol propane, glycerol and pentaerythritol. Many such poly isocyanates are commercially available, for example under the Desmodur trade mark from Bayer and under the Tolonate trade mark from Rhone Poulenc.

The polyisocyanates can optionally be blocked by reacting them with a blocking compound. A blocking compound is one which reacts reversibly with isocyanate groups to form an adduct which is stable at ordinary temperatures but which breaks down so as to regenerate the isocyanate groups at elevated temperatures, such as those used to cure the coating composition.

In order to make them dispersible in water, the polyisocyanates may also comprise a dispersion stabiliser, such as the product of the reaction between a polyisocyanate and a polyethylene glycol. Suitable stabilisers and mixtures of these stabilisers and polyisocyanates are known from European Patent EP-B-0 206 059 and European Patent EP-B-0 516 277.

Polyisocyanate crosslinkers are preferably used in an amount such that the ratio of isocyanate groups on the polyisocyanate to the number of hydroxyl groups on the polymer is in the range 0.8 to 2.

The compositions can also contain catalysts for the isocyanate-hydroxyl reaction. Suitable catalysts include tin catalysts such as dibutyl tin dilaurate and amine catalysts such as triethylamine.

The compositions can also contain other conventional paint additives such as reactive diluents, pigments, fillers, UV absorbers and flow aids.

The compositions can also comprise additional polymeric components such as film forming polymers. One example of a suitable additional film forming polymer is a conventional hydroxy functional acrylic addition polymer. Other examples are polyester polymers or polyurethane polymers. Preferably the polymeric components of the composition, excluding any crosslinkers, are made up of at least 40% by weight of acrylic addition polymer having carboxyl groups in which a proportion of the carboxyl groups are derived from a carboxyl functional chain transfer agent, more preferably at least 50% and most preferably at least 75%.

The acrylic addition polymer can be produced by conventional means. For example, in general it can be produced by contacting a mixture of the appropriate monomers including the chain transfer agent with a polymerisation initiator at a temperature at which polymerisation occurs. The process for preparing the addition polymer can be carried out in organic solution and the resulting polymer then transferred into an aqueous medium or, alternatively it can be carried out in the aqueous medium by aqueous emulsion polymerisation.

For example, the initiator can be fed into the solvent at the polymerisation temperature simultaneously with the monomer mixture. The resulting polymer can be transferred into the aqueous medium by firstly adding base so as to at least partially neutralise the carboxyl groups on the polymer and then dispersing the, at least partially, neutralised polymer in the aqueous medium. Alternatively, the polymer can be dispersed in a solution of the base in the aqueous medium so as to at least partially neutralise the carboxyl groups during the dispersion process.

When the polymer is made by emulsion polymerisation, the monomer mixture can be fed together with the initiator and a surfactant into the stirred aqueous medium held at the polymerisation temperature. Sufficient base to at least partially neutralise the carboxyl groups on the polymer can be added before, during or after polymerisation but is typically added afterwards.

A preferred process for preparing the coating composition comprises (i) contacting a mixture in organic solution of the appropriate monomers including the chain transfer agent with a polymerisation initiator at a temperature at which polymerisation occurs, (ii) contacting the resulting polymer with a base so as to at least partially neutralise the carboxyl groups on the polymer and (iii) forming a dispersion of the at least partially neutralised polymer in an aqueous medium. An alternative process comprises (i) contacting a mixture in organic solution of the appropriate monomers including the chain transfer agent with a polymerisation initiator at a temperature at which polymerisation occurs, and (ii) forming a dispersion of the polymer in an aqueous medium, containing a base so as to at least partially neutralise the carboxyl groups on the polymer.

Typical polymerisation temperatures are 50 to 140° C. when the process is carried out in solvent and 50 to 95° C. when it is carried out by emulsion polymerisation in water.

Initiators can include for example typical free radical and redox types such as hydrogen peroxide, t-butyl hydroperoxide, di-t-butyl peroxide, butylperoxy-2-ethyl hexanoate, benzoyl peroxide, 2,4-dichlorbenzoyl peroxide, t-butylperacetate, 2,2' azobis (2-methylbutyronitrile), ammonium persulphate, sodium persulphate, potassium persulphate, sodium and potassium perphosphates, and redox initiators such as persulphate/sodium formaldehyde sulphoxylate, cumene hydroperoxide/sodium metabisulphite, potassium persulphate/sodium bisulphite, cumene hydroperoxide/iron (II) sulphate and the like. Polymerisation initiators are usually added in amounts between about 0.1 and 6% by weight of the monomers polymerised, preferably between 0.5 and 5%.

Any crosslinker and any other components can be dispersed into the aqueous dispersion of addition polymer. Generally, when the crosslinker is an unblocked polyisocyanate then the composition is preferably made by adding the polyisocyanate, optionally as a solution in an organic solvent, to the aqueous dispersion shortly before use. This minimises problems with the potlife of the compositions.

The crosslinker and other components can also be mixed with the polymer before the polymer is dispersed in water.

The coating composition of the invention can be applied as a layer to the surface of a substrate and then allowed or caused to dry and cure. According to the present invention there is provided a process for coating a substrate which comprises the steps of applying a layer of a coating composition according to the present invention to a surface of the substrate and thereafter causing or allowing the layer to cure.

The compositions are particularly useful as vehicle refinish primers or topcoats. Primers are somewhat heavily pigmented compositions which are applied over the bare substrate or over the pre-existing coating before the new topcoat is applied. Topcoats are the final coating applied to give the vehicle its color and gloss as well as providing protection from the elements and physical damage.

The coating composition can be applied by conventional means such as brushing, rollercoating or spraying, preferably by spraying.

The applied layer can be allowed to cure at ambient temperature in the case where the polymer and crosslinker react together at ambient temperatures. This is generally the case for example when the polymer has hydroxyl groups and the crosslinker is a polyisocyanate.

Alternatively the layer can be baked at elevated temperatures, for example 50–130° C., either to accelerate curing or to cause curing when the crosslinker will only react with the polymer at elevated temperatures. This is generally the case when the polymer has hydroxyl groups and the crosslinker is a blocked polyisocyanate or a melamine formaldehyde.

According to the present invention there is also provided a coated article obtainable by the process.

The invention will now be illustrated by means of the following examples.

EXAMPLES

In these examples all parts are parts by weight unless otherwise indicated. In the experimental the following abbreviations and proprietory names are used; Dowanol DPM™ is dipropylene glycol monomethy ether, Dowanol PMA™ is propylene glycol monomethyl ether acetate, ADIB is azodiisobutyronitrile, MIAK is methyl isoamyl ketone, Vazo 67™ is an azo initiator 2,2-azo bis (2-methyl butyronitrile) and tBP is tertiary butyl perbenzoate and methyl propoxol acetate is propylene glycol monomethyl ether acetate.

1. Preparation of Aqueous Compositions 1 to 7

1.1 General method for aqueous compositions 1 to 4. The components listed in Table 1 were used in the following general method:

The solvent and α-methyl styrene were heated to 122–125° C. in a reaction vessel, fitted with stirrer, heating mantle, water condenser and nitrogen blanket. The mixture was held at this temperature and stirred while the monomer feed mixture and the initiator feed mixture were fed into the mixture over 165 minutes. The mixture was stirred for a further 15 minutes. The hydroxybutyl acrylate was added, followed by initiator shot 1. The mixture was stirred for 1 hour and allowed to cool. The theoretical acid value of these polymers was 16. Dimethyl ethanolamine (4.2 parts) was added to these resin solutions (300 parts) followed by water (381 parts) so as to form 35% non-volatile content aqueous compositions, with a 75% theoretical degree of neutralisation.

TABLE 1

|  | Composition 1 | Composition 2 (Comparative) | Composition 3 (Comparative) | Composition 4 (Comparative) |
|---|---|---|---|---|
| Reactor Charge |  |  |  |  |
| Dowanol DPM | 9.69 | 9.59 | 9.59 | 9.52 |
| Alpha-methyl styrene | 7.45 | 7.38 | 7.37 | 7.32 |
| Monomer Feed |  |  |  |  |
| butyl acrylate | 5.22 | 5.5 | 5.9 | 5.13 |
| alpha methyl styrene | 8.2 | 6.27 | 5.53 | 8.06 |
| isobornyl methacrylate | 13.41 | 13.28 | 13.27 | 13.18 |
| t-butyl acrylate | 14.9 | 14.76 | 14.75 | 14.65 |
| hydroxy butyl acrylate | 22.35 | 22.14 | 22.12 | 21.97 |
| Methacrylic acid | 0 | 0 | 1.84 | 0 |
| acrylic acid | 0 | 1.51 | 0 | 0 |
| mercaptopropionic acid | 2.24 | 0 | 0 | 0 |
| p-octyl mercaptan | 0 | 3.03 | 3.02 | 3 |
| Initiator Feed |  |  |  |  |
| Vazo 67 | 2.98 | 2.95 | 2.95 | 0.95 |
| Carboxy ADIB | 0 | 0 | 0 | 2.9 |
| MIAK | 8.94 | 8.86 | 8.85 | 8.79 |
| Monomer Shot |  |  |  |  |
| hydroxy butyl acrylate | 2.98 | 2.95 | 2.95 | 2.93 |
| Initiator Shot |  |  |  |  |
| Vazo 67 | 0 | 0 | 0 | 0.29 |
| t-BP | 0.3 | 0.3 | 0.29 | 0 |
| Dowanol DPM | 1.34 | 1.48 | 1.55 | 1.32 |
| TOTAL | 100 | 100 | 100 | 100 |

1.2 General method for aqueous compositions 5 to 7. The components listed in Table 2 were used in the following general method;

The solvent and α-methyl styrene were heated to 122–125° C. in a reaction vessel, fitted with stirrer, heating mantle, water condenser and nitrogen blanket. The mixture was held at this temperature and stirred while the monomer feed mixture and the initiator feed mixture were fed into the mixture over 195 minutes. The mixture was stirred for a further 30 minutes. Initiator shot 1 was added over 10 minutes, the mixture stirred for 30 minutes and the mixture was allowed to cool to 90° C. Initiator shot 2 was added over 10 minutes, the mixture was stirred for 10 minutes and then allowed to cool. All of the resulting polymers had a theoretical acid value of 20. Dimethyl ethanolamine (5.6 parts) was added to these resin solutions (300 parts) followed by water (395 parts) so as to form 35% non-volatile content aqueous compositions with a 75% theoretical degree of neutralisation.

TABLE 2

|  | Composition 5 | Composition 6 (comparative) | Composition 7 (comparative) |
|---|---|---|---|
| Reactor Charge |  |  |  |
| methyl propoxol acetate | 9.67 | 9.57 | 9.57 |
| Alpha-methyl styrene | 7.44 | 7.36 | 7.36 |
| Monomer Feed |  |  |  |
| styrene | 8.93 | 6.84 | 4.42 |
| butyl methacrylate | 32.74 | 32.38 | 34.44 |
| hydroxy butyl acrylate | 25.3 | 25.02 | 25.02 |
| Methacrylic acid | 0 | 0 | 2.35 |
| acrylic acid | 0 | 1.99 | 0 |
| mercaptopropionic acid | 2.98 | 0 | 0 |
| p-octyl mercaptan | 0 | 4.05 | 4.05 |
| Initiator Feed |  |  |  |
| Vazo 67 | 2.23 | 2.21 | 2.21 |
| Methyl propoxol acetate | 8.11 | 8.02 | 8.02 |
| Initiator Shot 1 |  |  |  |
| Vazo 67 | 0.22 | 0.22 | 0.22 |
| Methyl propoxol acetate | 1.49 | 1.47 | 1.47 |
| Initiator Shot 2 |  |  |  |
| Vazo 67 | 0.15 | 0.15 | 0.15 |
| Methyl propoxol acetate | 0.74 | 0.74 | 0.74 |
| TOTALS | 100 | 100 | 100 |

2. Storage Stability Testing

Samples of aqueous compositions dispersions 1 to 7 were stored at room temperature (about 17° C.) for 1 month. Compositions 1 and 5 according to the present invention, were hazy polymer solutions and showed no settling over this period. In contrast, Compositions 2, 3, 4, 6 and 7 were milky white emulsions which had all settled out over the 1 month period. Compositions 2 and 3 settled out particularly quickly and had completely settled after only 1 week, while Composition 4 settled out after only 2 weeks.

These results show the clear benefits of compositions 1 and 5 according to the present invention in terms of stability in comparison with compositions 2, 3, 6 and 7 in which the carboxyl functionality of the polymer is the same but is derived wholly from carboxyl functional monomers, (meth) acrylic acid. It also shows the benefit of compositions 1 and 5 according to the present invention made using a carboxyl functional chain transfer agent, in terms of stability in comparison with composition 4 in which the carboxyl functionality of the polymer is the same but is derived wholly from a carboxyl functional initiator which might have been expected to have a similar effect.

3. Performance Testing in Paint Compositions

Aqueous compositions 5 to 7 were made up into white paint compositions as follows. A pigment millbase was made by dispersing into water (5.32 parts) on a high speed disperser a proprietary pigment dispersant (1.84 parts), a proprietary antifoaming agent (0.24 parts) and titanium dioxide (16.69 parts). To this millbase was added in order, the aqueous compositions (45.8 parts), water (9.3 parts), Byk 346™ wetting additive (0.72 parts). Shortly prior to application a mixture of polyisocyanate crosslinker (a 3:1 wt/wt mix of Cythane 3174™ and Desmodur TP LS 2980™; 15.32 parts), and butyl glycol acetate (5.02 parts) was added and the mixture stirred well. Sufficient water to reduce the viscosity to 25s BS B4 cup was added to the compositions. The compositions were spray applied using HPLV spray to primed steel panels to a dry film thickness of 60–80 μm and cured at 60° C. for 30 minutes. The resulting paint films were left for seven days and then tested for hardness, water spotting, gloss and were subjected to the SMMT test which involved submerging them in water at 40° C. for 10 days. The results are given in Table 3 below.

TABLE 3

| Compo-sition | Hardness (s) | Gloss (%) | SMMT (10 Day) Blister | Initial Gloss (%) | Final Gloss (%) |
|---|---|---|---|---|---|
| 5 | 42 | 84 | none | 78 | 71 |
| 6 | 35 | 39 | 9F | 42 | 21 |
| 7 | 38 | 26 | 9MD | 25 | 15 |

4. Preparation of Aqueous Compositions 8 to 10

Aqueous compositions 8 and 9 were according to the invention, while composition 10 is a comparative example. All three of these compositions were made to have the same theoretical acid value of 24, the same non-volatile content of 35% and the same degree of neutralisation of 75%. The differences are that composition 8 derives all of its carboxyl groups from a carboxyl functional chain terminating agent, 3-mercaptopropionic acid, composition 9 derives its carboxyl functionality 58% from a carboxyl functional chain terminating agent, 3-mercaptopropionic acid, and 42% from a carboxyl functional monomer acrylic acid and composition 10 derives all of its carboxyl functionality from a carboxyl functional monomer acrylic acid.

The components listed in Table 4 were used in the following general method. The reactor charge was heated to 125° C. in a reaction vessel, fitted with stirrer, heating mantle, water condenser and nitrogen blanket. The mixture was held at this temperature and stirred while the monomer feed mixture and the initiator feed mixture were fed into the mixture over 180 minutes. The mixture was stirred for a further minutes. A mixture of Dowanol PMA (1.05 parts) and t-butyl perbenzoate (0.38 parts) was added to mop up remaining monomer, the mixture was stirred for 1 hour and allowed to cool. 10% aqueous dimethyl ethanolamine solution (42 parts) was added to these resin solutions (200 parts) along with Dowanol PMA (24 parts) followed by water demineralised (187 parts) so as to form 35% non-volatile content aqueous compositions, with a 75% theoretical degree of neutralisation.

TABLE 4

| | Composition 8 | Composition 9 | Composition 10 |
|---|---|---|---|
| Reactor Charge | | | |
| Dowanol PMA | 12.44 | 13.82 | 13.82 |
| monomer feed | | | |
| butylacrylate | 42.95 | 42.95 | 42.98 |
| methyl methacrylate | 9.46 | 8.49 | 7.13 |
| hydroxy ethyl acrylate | 22.6 | 22.59 | 22.59 |
| acrylic acid | 0 | 0.96 | 2.31 |
| 3-mercaptopropionic acid | 3.63 | 2.25 | 0 |
| p-octyl mercaptan | 0 | 0 | 2.63 |
| Vazo 67 | 3.38 | 3.38 | 3.38 |
| Dowanol PMA | 4.13 | 4.13 | 3.75 |

These compositions were stored for 48 hours at 40° C. After this period, composition 10 had separated out completely into two layers, a clear upper layer and a layer of sediment. In contrast composition 8 showed very little sedimentation and composition 9 none.

What is claimed is:

1. An aqueous coating composition comprising a dispersion in an aqueous medium of a film-forming acrylic addition polymer having carboxyl groups thereon in which at least 50% of the carboxyl groups on the acrylic addition polymer are derived from a carboxyl functional chain transfer agent, the composition also comprising a crosslinker and a base, wherein the base is present in an amount sufficient to at least partially neutralize the carboxyl groups on the polymer.

2. A composition as claimed in claim 1 in which the polymer has hydroxyl functional units.

3. A composition as claimed in claim 2 in which the polymer comprises 10 to 50% of hydroxyl functional units.

4. A coating composition claim 1 in which the carboxyl functional chain transfer agent makes up 0.5 to 10% by weight of the polymer.

5. A coating composition claim 1 in which the carboxyl functional chain transfer agent is 3-mercaptopropionic acid.

6. A coating composition claim 1 in which the acrylic addition polymer has an acid value of less than 50.

7. A coating composition claim 1 in which the acrylic addition polymer has a number average molecular weight as measured by gel permeation chromatography of 700 to 10 000.

8. A coating composition as claimed in claim 1 in which the amount of base present is such as to be capable of neutralizing 30% to 100% of the carboxyl groups on the acrylic addition polymer.

9. A coating composition as claimed in claim 1 in which the crosslinker is a polyisocyanate or a melamine resin.

10. A process for preparing a coating composition as claimed in claim 1, which comprises (i) contacting a mixture in organic solution of the appropriate monomers including the chain transfer agent with a polymerization initiator at a temperature at which polymerization occurs, (ii) contacting the resulting polymer with a base so as to at least partially neutralize the carboxyl groups on the polymer and (iii) forming a dispersion of a crosslinker and the at least partially neutralized polymer in an aqueous medium.

11. A process for preparing a coating composition as claimed in claim 1 which comprises (i) contacting a mixture in organic solution the appropriate monomers including the chain transfer agent with a polymerization initiator at a temperature at which polymerization occurs, and (ii) and forming a dispersion of a crosslinker and the polymer in an aqueous medium containing a base so as to at least partially neutralize the carboxyl groups on the polymer.

* * * * *